(12) United States Patent
Kishimoto et al.

(10) Patent No.: US 8,460,097 B2
(45) Date of Patent: Jun. 11, 2013

(54) INFORMATION STORAGE MEDIUM AND GAME IMAGE GENERATION DEVICE

(75) Inventors: Naoyuki Kishimoto, Tokyo (JP); Masamoto Katsuyama, Tokyo (JP)

(73) Assignee: NAMCO BANDAI Games Inc., Tokyo (JP)

(*) Notice: Subject to any disclaimer, the term of this patent is extended or adjusted under 35 U.S.C. 154(b) by 312 days.

(21) Appl. No.: 13/031,380

(22) Filed: Feb. 21, 2011

(65) Prior Publication Data

US 2011/0212776 A1 Sep. 1, 2011

(30) Foreign Application Priority Data

Feb. 26, 2010 (JP) .................................. 2010-42313

(51) Int. Cl.
*A63F 9/24* (2006.01)
*A63F 13/00* (2006.01)
*G06F 17/00* (2006.01)
*G06F 19/00* (2006.01)

(52) U.S. Cl.
USPC .................. 463/31; 463/20; 463/25; 463/30; 348/47; 439/894

(58) Field of Classification Search
USPC .............. 463/20, 25, 30, 31; 348/47; 439/894
See application file for complete search history.

(56) References Cited

U.S. PATENT DOCUMENTS

2006/0217008 A1* 9/2006 Higashino et al. ............ 439/894
2012/0113228 A1* 5/2012 Konno et al. ................... 348/47
2012/0231883 A1* 9/2012 Hayashi et al. ................ 463/31

FOREIGN PATENT DOCUMENTS

JP A-2006-148773 6/2006

* cited by examiner

*Primary Examiner* — Omkar Deodhar
*Assistant Examiner* — Adetokunbo O Torimiro
(74) *Attorney, Agent, or Firm* — Posz Law Group, PLC

(57) ABSTRACT

A portable information terminal includes a state determination section that determines whether a current state of a screen is in a first state in which a first area in the screen is not touched, or in a second state in which the first area is touched, based on a touch operation and a touch position on the screen, an image generation section that generates an image in which a current touch position image is returned to an initial position when the second state changes to the first state, an update section that updates operation data based on the touch operation and the touch position in the first area when the screen is in the second state, the operation data indicating an operation direction and an operation amount of a moving object in a game space, and a calculation section that performs calculations for moving the moving object based on the operation data.

13 Claims, 12 Drawing Sheets

INFORMATION STORAGE MEDIUM AND GAME IMAGE GENERATION DEVICE

Japanese Patent Application No. 2010-42313, filed on Feb. 26, 2010, is hereby incorporated by reference in its entirety.

BACKGROUND OF THE INVENTION

The present invention relates to an information storage medium and a game image generation device.

A program that is executed by a device that includes a touch operation detection section that detects a touch operation on a screen, and a tilt detection section that detects the tilt of a housing of the device, has employed a first method that generates an image based on a housing tilt operation or a second method that generates an image based on a touch operation, for example.

JP-A-2006-148773 discloses detecting the tilt of a housing, and controlling reproduction of media contents based on the detection output (first method). As a specific example that uses the first method, a racing game that allows the player to control (adjust) the moving direction of a racing car in a game space by tilting a portable information terminal is disclosed.

According to the above specific example, when the user has turned the steering wheel to the right by tilting the portable information terminal to the right, for example, the user must return the portable information terminal to the horizontal state in order to return the steering wheel to the initial position. However, the user may tilt the portable information terminal to the left to a large extent when returning the portable information terminal to the horizontal state. Moreover, it is difficult to maintain the horizontal state, and an accurate reaction to the tilt may not be obtained depending on the hardware of the tilt detection section.

A racing game or the like may require a gear shift operation. In this case, an accurate reaction may not be obtained when using the first method for the above reasons. When it is necessary to perform a gear shift operation in addition to a steering operation, an acceleration operation, a deceleration operation, and the like, a gear shift operation button is normally fixed at a given position within the screen. According to the second method, the user must use three fingers at the same time when simultaneously performing the steering operation, the acceleration operation, and the gear shift operation, for example. This impairs operability.

SUMMARY

According to a first aspect of the invention, there is provided a non-transitory computer-readable information storage medium storing a program that can be executed by a computer that generates a game image in which a moving object moves in a game space based on a touch operation and a touch position on a screen, the program causing the computer to function as:

a state determination section that determines whether a current state of the screen is in a first state in which a first area in the screen is not touched or in a second state in which the first area is touched, based on the touch operation and the touch position;

an image generation section that generates a first image when the screen is in the first state and generates a second image when the screen is in the second state, the first image being an image in which an operation image in the first area is not changed, and the second image being an image in which the operation image in the first area is changed;

an update section that updates operation data based on the touch operation and the touch position in the first area when the screen is in the second state, the operation data indicating an operation direction and an operation amount of the moving object; and a calculation section that performs calculations for moving the moving object based on the operation data, the image generation section generating an image in which a current touch position image indicating a current touch position is moved corresponding to a change in the touch position, and generating an image in which the current touch position image is returned to an initial position when the second state changes to the first state, as part of the operation image, based on the touch operation and the touch position; and the update section initializing the operation data when the second state changes to the first state.

According to a second aspect of the invention, there is provided a non-transitory computer-readable information storage medium storing a program that can be executed by a computer that generates a game image in which a moving object moves in a game space based on a touch operation and a touch position on a screen, the program causing the computer to function as:

an update section that updates operation data based on the touch operation and the touch position when the touch operation is performed in a first direction in a first area set in the screen, the operation data indicating an operation direction and an operation amount of the moving object; and a calculation section that performs calculations for moving the moving object based on the operation data, the update section updating a movement parameter for changing a moving speed of the moving object based on the touch operation and the touch position when the touch operation is performed in a second direction that is different from the first direction in a state in which the touch operation is performed in the first direction.

According to a third aspect of the invention, there is provided a game image generation device comprising:

a state determination section that determines whether a current state of a screen is in a first state in which a first area in the screen is not touched or in a second state in which the first area is touched, based on a touch operation and a touch position on the screen;

an image generation section that generates a first image when the screen is in the first state and generates a second image when the screen is in the second state, the first image being an image in which an operation image in the first area is not changed, and the second image being an image in which the operation image in the first area is changed;

an update section that updates operation data based on the touch operation and the touch position in the first area when the screen is in the second state, the operation data indicating an operation direction and an operation amount of the moving object; and a calculation section that performs calculations for moving the moving object based on the operation data, the image generation section generating an image in which a current touch position image indicating a current touch position is moved corresponding to a change in the touch position, and generating an image in which the current touch position image is returned to an initial position when the second state changes to the first state, as part of the operation image, based on the touch operation and the touch position; and the update section initializing the operation data when the second state changes to the first state.

DETAILED DESCRIPTION OF THE EMBODIMENT

Figure 1:
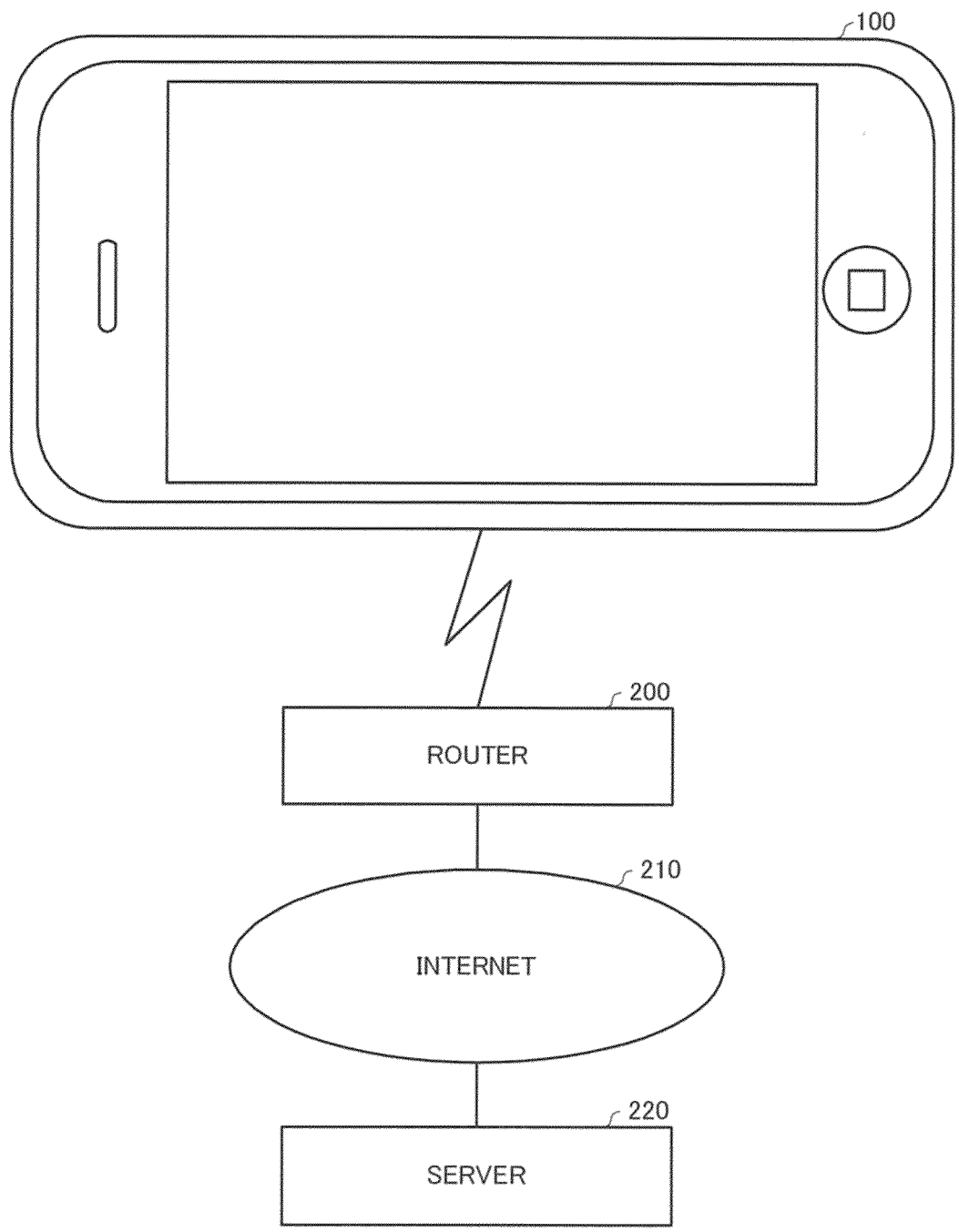
FIG. 1 is a diagram illustrating an example of a communication configuration according to a first embodiment of the invention.

The invention may provide an information storage medium and a game image generation device that can improve operability when moving a moving object in a game space based on a touch operation.

According to one embodiment of the invention, there is provided a non-transitory computer-readable information storage medium storing a program that can be executed by a computer that generates a game image in which a moving object moves in a name space based on a touch operation and a touch position on a screen, the program causing the computer to function as:

a state determination section that determines whether a current state of the screen is in a first state in which a first area in the screen is not touched or in a second state in which the first area is touched, based on the touch operation and the touch position;

an image generation section that generates a first image when the screen is in the first state and generates a second image when the screen is in the second state, the first image being an image in which an operation image in the first area is not changed, and the second image being an image in which the operation image in the first area is changed;

an update section that updates operation data based on the touch operation and the touch position in the first area when the screen is in the second state, the operation data indicating an operation direction and an operation amount of the moving object; and a calculation section that performs calculations for moving the moving object based on the operation data, the image generation section generating an image in which a current touch position image indicating a current touch position is moved corresponding to a change in the touch position, and generating an image in which the current touch position image is returned to an initial position when the second state changes to the first state, as part of the operation image, based on the touch operation and the touch position; and the update section initializing the operation data when the second state changes to the first state.

According to one embodiment of the invention, there is provided a game image generation device comprising:

a state determination section that determines whether a current state of a screen is in a first state in which a first area in the screen is not touched or a second state in which the first area is touched, based on a touch operation and a touch position on the screen;

an image generation section that generates a first image when the screen is in the first state and generates a second image when the screen is in the second state, the first image being an image in which an operation image in the first area is not changed, and the second image being an image in which the operation image in the first area is changed;

an update section that updates operation data based on the touch operation and the touch position in the first area when the screen is in the second state, the operation data indicating an operation direction and an operation amount of the moving object; and a calculation section that performs calculations for moving the moving object based on the operation data, the image generation section generating an image in which a current touch position image indicating a current touch position is moved corresponding to a change in the touch position, and generating an image in which the current touch position image is returned to an initial position when the second state changes to the first state, as part of the operation image, based on the touch operation and the touch position; and the update section initializing the operation data when the second state changes to the first state.

The above embodiments makes it possible to update the operation data that indicates the operation direction and the operation amount of the moving object in the game space based on the touch operation and the touch position, and to move the moving object based on the operation data. Therefore, the user can move the moving object by changing the touch position. Operability in moving the moving object in the game space based on the touch operation is thus improved. Moreover, since the above embodiments makes it possible to notify the user of the touch state in the first area by generating different images depending on the touch state in the first area, operability is further improved.

According to one embodiment of the invention, there is provided a non-transitory computer-readable information storage medium storing a program that can be executed by a computer that generates a game image in which a moving object moves in a game space based on a touch operation and a touch position on a screen, the program causing the computer to function as:

an update section that updates operation data based on the touch operation and the touch position when the touch operation is performed in a first direction in a first area set in the screen, the operation data indicating an operation direction and an operation amount of the moving object; and a calculation section that performs calculations for moving the moving object based on the operation data, the update section updating a movement parameter for changing a moving speed of the moving object based on the touch operation and the touch position when the touch operation is performed in a second direction that is different from the first direction in a state in which the touch operation is performed in the first direction.

According to the above embodiment, the game image generation device updates the operation data indicating the operation direction and the operation amount of the moving object in the game space based on the touch operation and the touch position, and moves the moving object based on the operation data. Therefore, the user can change the moving speed of the moving object by changing the touch position in the second direction that is different from the first direction while moving the moving object by changing the touch position in the first direction. This further improves operability.

In each of the above information storage medium and the above game image generation device, the moving object may change in moving speed based on a movement parameter;

the state determination section may determine whether or not a second area or a third area in the screen is touched based on the touch operation and the touch position when the screen is in the second state; and the image generation section may generate a movement parameter increase image that receives an operation for increasing the movement parameter as part of the operation image when the second area is touched, and may generate a movement parameter decrease image that receives an operation for decreasing the movement parameter as part of the operation image when the third area is touched.

According to this configuration, the movement parameter increase image or the movement parameter decrease image can be generated as part of the operation image based on the touch operation and the touch position in a moving operation. Therefore, the user can perform an operation for increasing or decreasing movement parameters such as a gear change operation while performing the moving operation. This improves operability.

In each of the above information storage medium and the above game image generation device, the moving object may change in moving speed based on a movement parameter;

the operation image may include a movement parameter increase image that receives an operation for increasing the movement parameter, and a movement parameter decrease image that receives an operation for decreasing the movement parameter;

the state determination section may determine whether or not a second area or a third area in the screen is touched based on the touch operation and the touch position when the screen is in the second state; and the image generation section may generate the operation image in which the movement parameter increase image is enabled and the movement parameter decrease image is disabled when the second area is touched, and may generate the operation image in which the movement parameter increase image is disabled and the movement parameter decrease image is enabled when the third area is touched.

According to this configuration, the movement parameter increase image or the movement parameter decrease image can be generated as part of the operation image based on the touch operation and the touch position in the moving operation. Therefore, the user can perform an operation for increasing or decreasing movement parameters such as a gear change operation almost at the same time as the moving operation. This improves operability.

In each of the above information storage medium and the above game image generation device, the state determination section may set the second area above the current touch position image in the screen, may set the third area below the current touch position image in the screen, and may move the second area and the third area corresponding to movement of the current touch position image.

According to this configuration, the second area can be set above the current touch position image, and the third area can be set below the current touch position image. Therefore, the user can perform the movement parameter increase operation slightly above the current touch position image, and can perform the movement parameter decrease operation slightly below the current touch position image regardless of the current position of the current touch position image. This improves operability.

In each of the above information storage medium and the above game image generation device, the image generation section may generate the movement parameter increase image above the current touch position image, may generate the movement parameter decrease image below the current touch position image, and may move the movement parameter increase image and the movement parameter decrease image corresponding to movement of the current touch position image.

According to this configuration, the movement parameter increase image can be generated slightly above the current touch position image, and the movement parameter decrease image can be generated slightly below the current touch position image regardless of the current position of the current touch position image. Therefore, the user can easily determine the position at which an operation for changing the moving speed should be performed. This improves operability.

In each of the above information storage medium and the above game image generation device, the image generation section may generate the first image or the second image in a state in which the operation image is displayed in a lower left area of the screen, and an acceleration image for accelerating the moving object and a deceleration image for decelerating the moving object are displayed in a lower right area of the screen, when the screen is divided into four areas of upper left, upper right, lower left, and lower right.

According to this configuration, the user can perform the acceleration operation and the deceleration operation with the right hand thumb, and can perform the moving operation with the left hand thumb, for example. This improves operability.

Some embodiments in which the invention is applied to a portable information terminal are described below with reference to the drawings. Note that the following embodiments do not unduly limit the scope of the invention as stated in the claims. Note also that all of the elements described below should not necessarily be taken as essential elements of the invention.

First Embodiment

FIG. 1 is a diagram illustrating an example of a communication configuration according to a first embodiment. A portable information terminal 100 that functions as a game device that generates a game image downloads a racing game program from a server 220 via a router 200 and an Internet 210, and executes the racing game.

Figure 2:
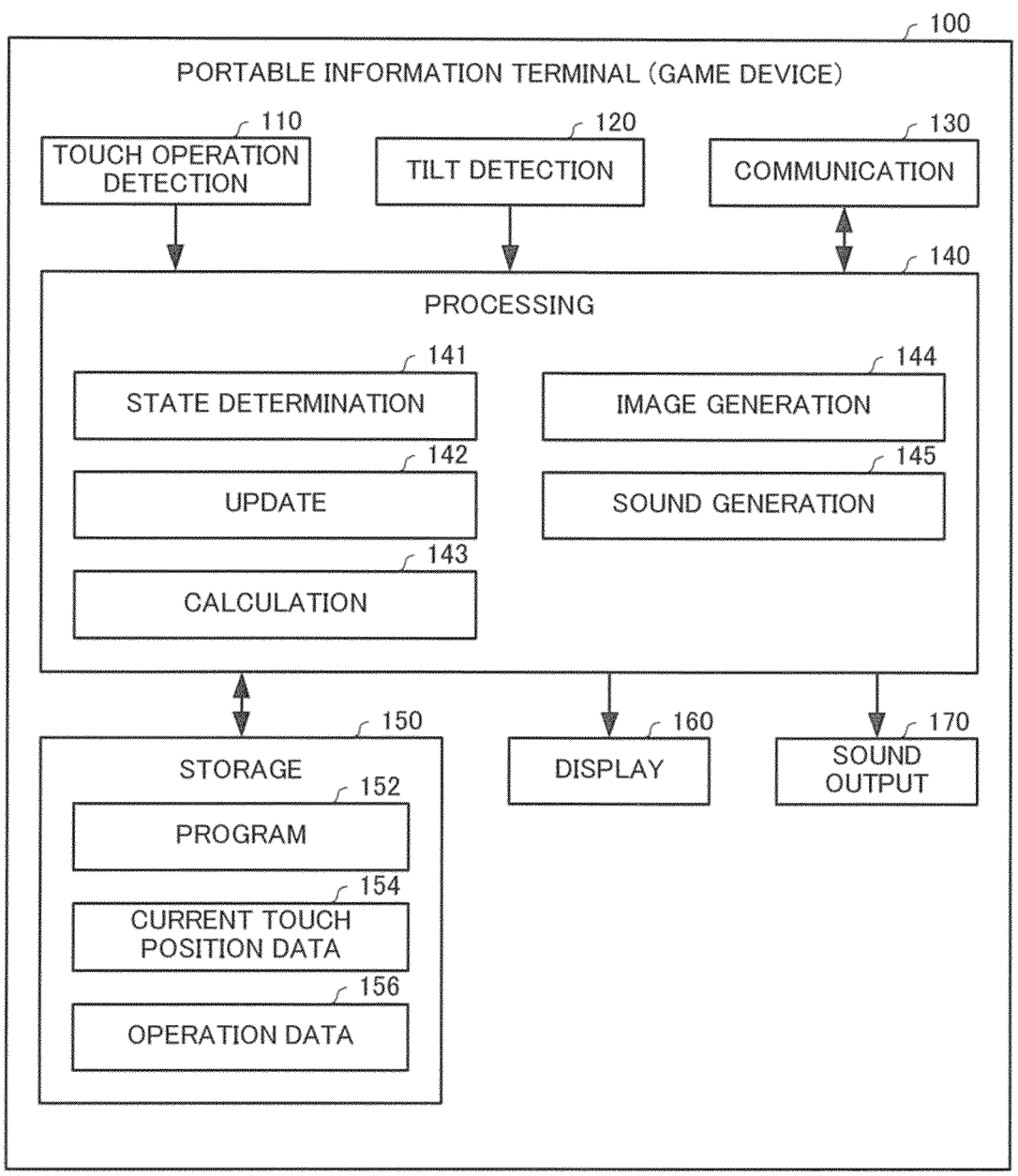
FIG. 2 is a functional block diagram of a portable information terminal according to the first embodiment of the invention.

FIG. 2 is a functional block diagram of the portable information terminal 100 according to the first embodiment. The portable information terminal 100 includes a touch operation detection section 110 that detects a touch operation and a touch position on a screen, a tilt detection section 120 that detects the tilt of a housing of the portable information terminal 100, a communication section 130 that performs a wireless communication with the router 200 and the like, a processing section 140 that performs various processes, a storage section 150 that stores data, a display section 160 that displays a game image and the like, and a sound output section 170 that outputs game sound and the like.

The processing section 140 includes a state determination section 141 that determines a touch state and the like in a given area within the screen, an update section 142 that updates data stored in the storage section 150, a calculation section 143 that performs game calculations and the like, an image generation section 144 that generates a game image and the like, and a sound generation section 145 that generates game sound and the like.

The storage section 150 stores a program 152 downloaded from the server 220, current touch position data 154 that indicates the current touch position in a steering area and the like, operation data 156 that indicates the operation direction, the operation amount, and the like of a racing car (moving object) in a game space, and the like.

The functions of the portable information terminal 100 may be implemented using the following hardware. For example, the touch operation detection section 110 and the display section 160 may be implemented using a touch panel or the like, the tilt detection section 120 may be implemented using an acceleration sensor or the like, the communication section 130 may be implemented using a wireless communication unit or the like, the processing section 140 may be implemented using a CPU, an image processing circuit, a sound processing circuit, or the like, the storage section 150 may be implemented using a RAM or the like, and the sound output section 170 may be implemented using a speaker or the like.

The portable information terminal 100 may download the program 152 from an information storage medium such as a hard disk of a PC or a USB memory instead of an information storage medium of the server 220, and function as the state determination section 141 and the like.

Figure 3:
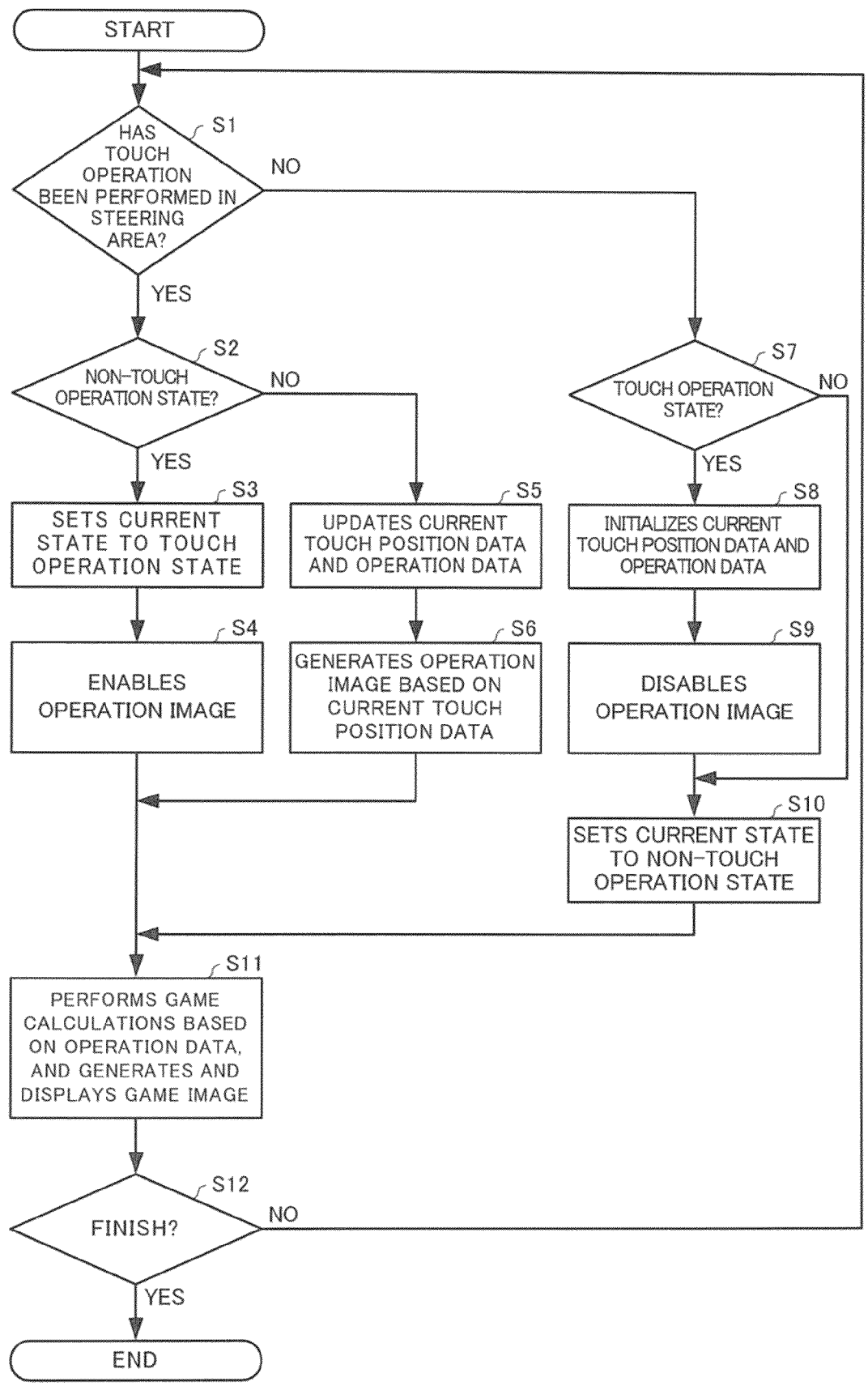
FIG. 3 is a flowchart illustrating a game image display process according to the first embodiment of the invention.
Figure 4:
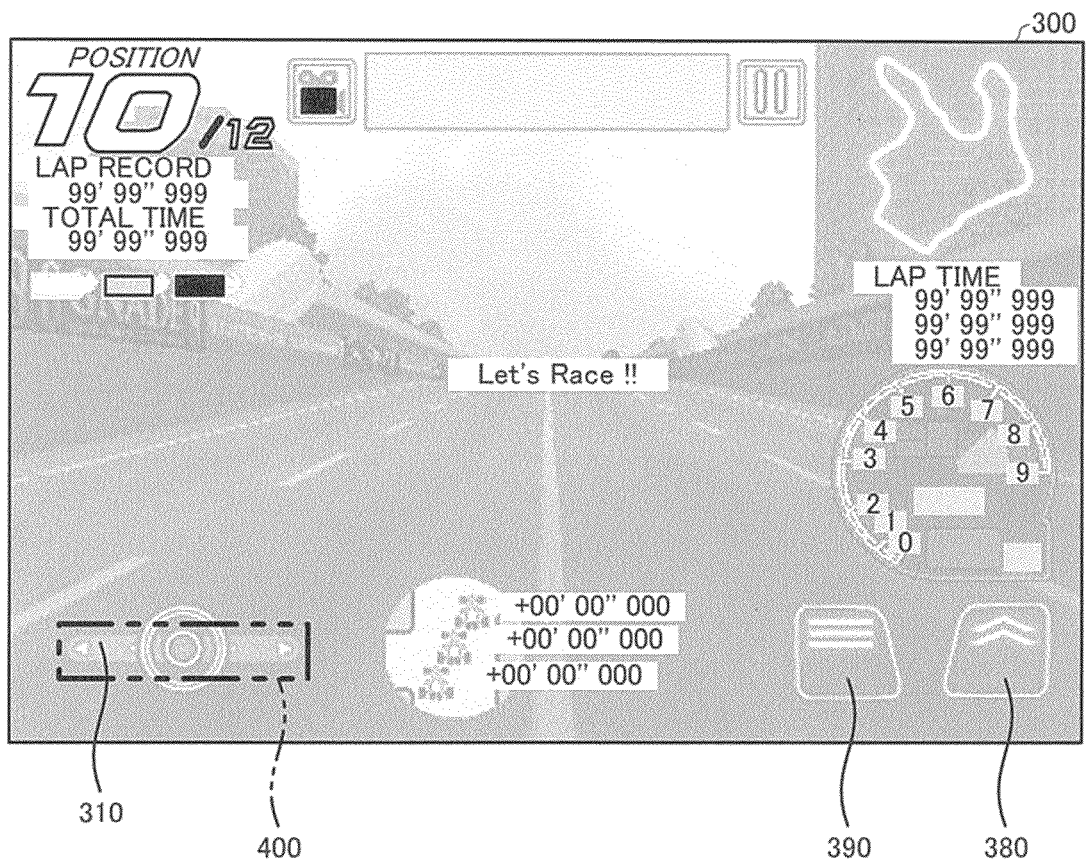
FIG. 4 is a diagram illustrating an example of a game image according to the first embodiment of the invention.

A game image display process according to the first embodiment in connection with a racing car moving operation is described below. FIG. 3 is a flowchart illustrating the game image display process according to the first embodiment. FIG. 4 is a diagram illustrating an example of a game image 300 according to the first embodiment.

The game image 300 includes an image that indicates the current ranking, a button image used to change a viewpoint and a display, a pause button image, an image that indicates the entire racing course, an image that indicates a sudden acceleration parameter, an image that indicates the engine speed, an image that indicates a movement parameter, an image that indicates the speed, an operation image 310 that corresponds to a steering operation and the like, an image that indicates the time difference from the leading or following racing car at a checkpoint, an acceleration image 380 that corresponds to an acceleration operation, a deceleration image 390 that corresponds to a braking operation, and the like.

The operation image 310 is displayed in a lower left area of the screen, and the acceleration image 380 for accelerating the racing car and the deceleration image 390 for decelerating the racing car are displayed in a lower right area of the screen. A steering area (first area) 400 is set in the area of the operation image 310.

Note that the steering area 400 is not displayed. For example, the user accelerates the racing car by touching the acceleration image 380 with the right thumb, or decelerates the racing car by touching the deceleration image 390 with the right thumb. The user steers the racing car by touching the operation image 310 with the left thumb, for example. The user can perform a sudden acceleration operation corresponding to the sudden acceleration parameter by pressing a thumb against an arbitrary area of the screen, moving the thumb upward, and removing the thumb from the screen (flick operation).

The touch operation detection section 110 detects a touch operation performed on the screen. The state determination section 141 determines whether or not a touch operation (e.g., an operation that presses part of the steering area 400 or an operation that moves a thumb while pressing the steering area 400) has been performed in the steering area 400 based on the detection result of the touch operation detection section 110 (step S1). The state determination section 141 also determines whether or not the current state is a non-touch operation state (first state) (i.e., a state in which the operation image 310 is not touched) (step S2). The initial state is the non-touch operation state.

When the state determination section 141 has determined that the current state is the non-touch operation state, the state determination section 141 sets the current state to a touch operation state (second state) by updating a flag value, for example (step S3), and the image generation section 144 enables the operation image 310 (step S4).

Figure 5:
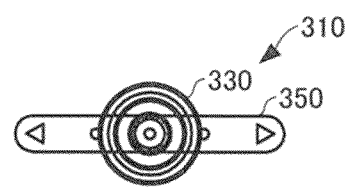
FIG. 5 is a diagram illustrating an example of an operation image according to the first embodiment of the invention.
Figure 6:
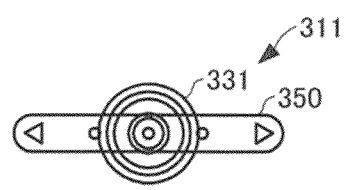
FIG. 6 is a diagram illustrating another example of an operation image according to the first embodiment of the invention.
Figure 7:
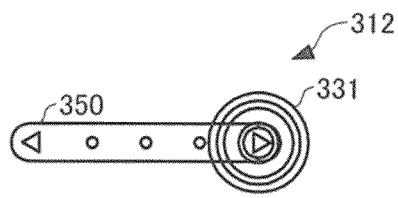
FIG. 7 is a diagram illustrating yet another example of an operation image according to the first embodiment of the invention.

FIG. 5 is a diagram illustrating an example of the operation image (310) according to the first embodiment. FIG. 6 is a diagram illustrating another example of the operation image (311) according to the first embodiment. FIG. 7 is a diagram illustrating still another example of the operation image (312) according to the first embodiment.

The operation image 310 includes a current touch position image 330 that indicates the current touch position within the operation image 310, and a movable area image 350 that indicates the movable range of the current touch position image 330.

When the current state is the non-touch operation state, the current touch position image 330 is displayed using a thick line (see the operation image 310 illustrated in FIG. 5). When the current state is the touch operation state, the current touch position image 331 is displayed using a thin line (see the operation image 311 illustrated in FIG. 6).

When the user turns the steering wheel in the rightward direction (first direction) so that the racing car turns right, the user moves the current touch position image 331 in the rightward direction. An operation image 312 illustrated in FIG. 7 indicates that the current touch position image 331 has moved to the right end of the movable area image 350 since the user has turned the steering wheel in the rightward direction to a maximum extent.

When the state determination section 141 has determined that the current state is the touch operation state in the step S2, the update section 142 updates the current touch position data 154 and the operation data 156 based on the detection result of the touch operation detection section 110 (step S5).

The image generation section 144 generates the operation image 311 based on the current touch position data 154. Specifically, the image generation section 144 generates the operation image 312 in which the current touch position image 331 has moved, as illustrated in FIG. 7.

When the state determination section 141 has determined that the touch operation has not been performed in the steering area 400 in the step S1, the state determination section 141 determines whether or not the current state is the touch operation state (step S7). Specifically, the state determination section 141 determines whether or not a transition from the touch operation state to the non-touch operation state (i.e., a state in which the user has removed the thumb from the screen) has occurred.

When the state determination section 141 has determined that a transition from the touch operation state to the non-touch operation state has occurred, the update section 142 initializes the current touch position data 154 and the operation data 156 (step S8), and the image generation section 144 disables the operation image 310 (step S9). Specifically, when the user has removed a thumb from the screen in a state illustrated in FIG. 7, the operation image 312 changes to the operation image 310 illustrated in FIG. 5, and the current touch position image 330 returns to the center of the movable area image 350 (disabled state).

When the state determination section 141 has determined that the touch operation has not been performed in the steering area 400 in the step S1, the state determination section 141 sets the current state to the non-touch operation state (step S10).

The calculation section 143 performs the game calculations based on operation data 156 and the like, the image generation section 144 generates the game image 300 based on the game calculation results and the like, and the display section 160 displays the game image 300 (step S11). When a sound output mode has been selected, the sound generation section 145 generates game sound (e.g., engine sound) based on the game calculation results and the like, and the sound output section 170 outputs the game sound.

The processing section 140 determines whether or not the user has issued finish instructions (step S12). When the processing section 140 has determined that the user has issued finish instructions, the processing section 140 finishes the above process (steps S1 to S12). When the processing section 140 has determined that the user has not issued finish instructions, the processing section 140 continues the above process.

According to the first embodiment, the portable information terminal 100 updates the operation data 156 that indicates the operation direction and the operation amount of the moving object (racing car) in the game space based on the detection result of the touch operation detection section 110, and moves the moving object based on the operation data 156. Therefore, the user can move the moving object by changing the touch position. The portable information terminal 100 thus improves operability when the moving object is moved in the game space based on the touch operation.

According to the first embodiment, since the portable information terminal 100 can notify the user of the touch state in the steering area 400 by displaying the current touch position image 330 or 331 (generating a different image) depending on the touch state in the steering area 400, operability can be further improved.

Second Embodiment

When the racing car is an automatic transmission (AT) car, a gear change operation is unnecessary. When the racing car is a manual transmission (MT) car, it is necessary to perform an operation (e.g., gear change operation) that increases or decreases the movement parameter for changing the moving speed of the racing car. A process of the portable information terminal 100 in connection with the gear change operation is described below.

Figure 8:
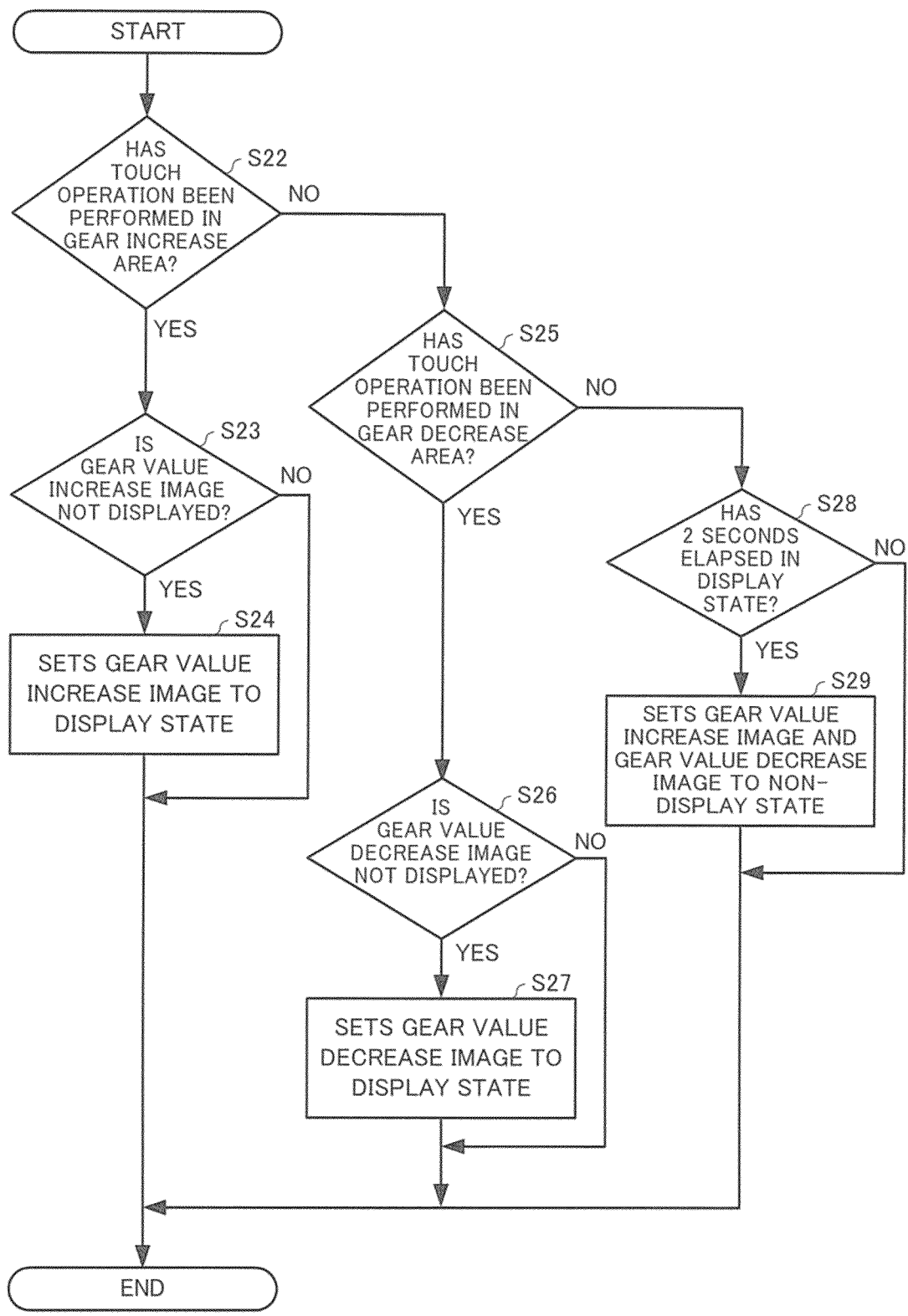
FIG. 8 is a flowchart illustrating a process relating to a gear value increase image and a gear value decrease image according to a second embodiment of the invention.
Figure 9:
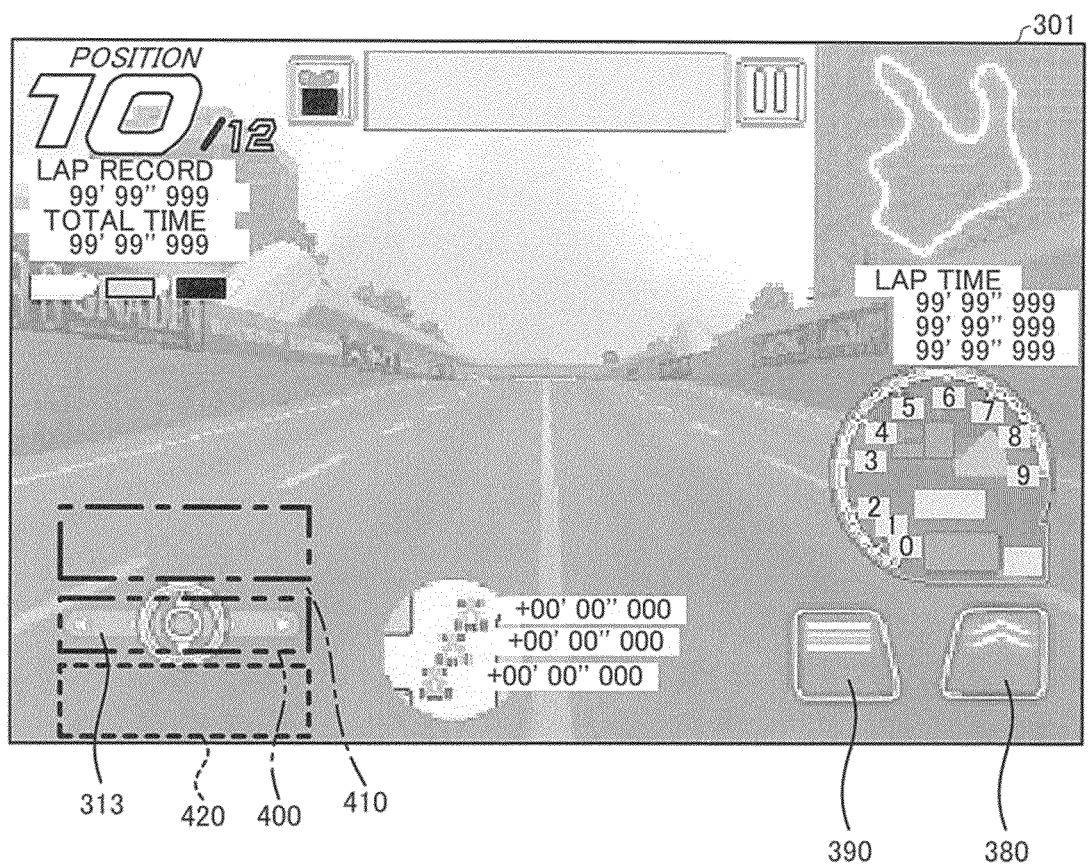
FIG. 9 is a diagram illustrating an example of a game image according to the second embodiment of the invention.

FIG. 8 is a flowchart illustrating a process according to a second embodiment in connection with a gear value increase image and a gear value decrease image. FIG. 9 is a diagram illustrating an example of a game image 301 according to the second embodiment. A gear increase area (second area) 410 for increasing a gear value (movement parameter) and a gear decrease area (third area) 420 for decreasing the gear value are set in the screen where the game image 301 is displayed, the gear increase area 410 being set above a steering area 400, and the gear decrease area 420 being set below the steering area 400. Note that the gear increase area 410 and the gear decrease area 420 are not displayed in the same manner as the steering area 400.

The process illustrated in FIG. 8 is performed immediately after the step S4 or the step S6 illustrated in FIG. 3. The state determination section 141 determines whether or not a touch operation has been performed in the gear increase area 410 based on the detection result of the touch operation detection section 110 (step S22).

Figure 10:
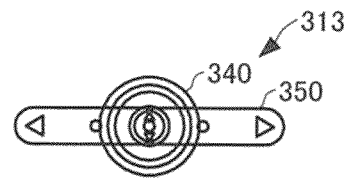
FIG. 10 is a diagram illustrating an example of an operation image according to the second embodiment of the invention.
Figure 11:
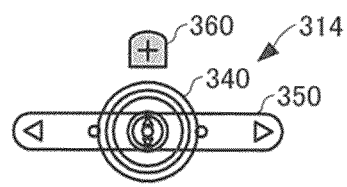
FIG. 11 is a diagram illustrating another example of an operation image according to the second embodiment of the invention.
Figure 12:
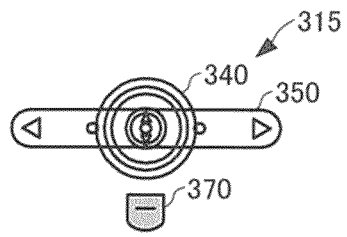
FIG. 12 is a diagram illustrating another example of an operation image according to the second embodiment of the invention.
Figure 13:
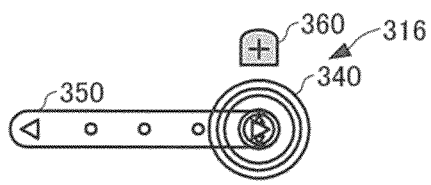
FIG. 13 is a diagram illustrating yet another example of an operation image according to the second embodiment of the invention.

FIG. 10 is a diagram illustrating an example of an operation image (313) according to the second embodiment. FIG. 11 is a diagram illustrating another example of the operation image (314) according to the second embodiment. FIG. 12 is a diagram illustrating another example of the operation image (315) according to the second embodiment. FIG. 13 is a diagram illustrating yet another example of the operation image (316) according to the second embodiment.

The operation image 313 that has been enabled includes a current touch position image 340 and a movable area image 350. The current touch position image 340 differs from the current touch position image 331 according to the first embodiment in that the current touch position image 340 includes an upward triangle and a downward triangle at the center in order to indicate that the user can shift the gear. The current touch position image that has been disabled is displayed using a thick line in the same manner as in the first embodiment.

When the state determination section 141 has determined that a touch operation has been performed in the gear increase area 410, the state determination section 141 determines whether or not a gear value increase image (movement parameter increase image) 360 is not displayed (step S23). When the state determination section 141 has determined that the gear value increase image 360 is not displayed, the state determination section 141 sets the gear value increase image 360 to a display state (step S24).

The operation image 314 including the gear value increase image 360 is thus displayed (see FIG. 11). The user can increase the gear value by one by moving a thumb in the upward direction (second direction) while pressing the current touch position image 340. The user can successively increase the gear value by repeatedly pressing the gear value increase image 360, and removing the thumb from the gear value increase image 360.

When the state determination section 141 has determined that a touch operation has not been performed in the gear increase area 410, the state determination section 141 determines whether or not a touch operation has been performed in the gear decrease area 420 based on the detection result of the touch operation detection section 110 (step S25).

When the state determination section 141 has determined that a touch operation has been performed in the gear decrease area 420, the state determination section 141 determines whether or not a gear value decrease image (movement parameter decrease image) 370 is not displayed (step S26). When the state determination section 141 has determined that the gear value decrease image 370 is not displayed, the state determination section 141 sets the gear value decrease image 370 to a display state (step S27).

The operation image 315 including the gear value decrease image 370 is thus displayed (see FIG. 12). The user can decrease the gear value by one by moving a thumb in the downward direction (second direction) while pressing the current touch position image 340. The user can successively decrease the gear value by repeatedly pressing the gear value decrease image 370, and removing the thumb from the gear value decrease image 370.

The image generation section 144 generates the operation images 314 to 316 based on the current touch position data 154 so that the gear value increase image 360 is displayed above the current touch position image 340, and the gear value decrease image 370 is displayed below the current touch position image 340 (step S6).

The state determination section 141 determines whether or not 2 seconds has elapsed in a state in which the gear value increase image 360 or the gear value decrease image 370 is displayed, and a new touch operation has not been performed (step S28). When the state determination section 141 has determined that 2 seconds has elapsed in the above state, the state determination section 141 sets the gear value increase image 360 or the gear value decrease image 370 that has been displayed to a non-display state (step S29).

The operation image 313 that does not include the gear value increase image 360 and the gear value decrease image 370 is thus displayed (see FIG. 10).

According to the second embodiment, the portable information terminal 100 generates the gear value increase image 360 or the gear value decrease image 370 as part of the operation images 314 to 316 based on the detection result of the touch operation detection section 110 when a moving operation is performed, so that the user can increase or decrease the movement parameter (e.g., gear change operation) almost at the same time as the moving operation. The portable information terminal 100 thus improves operability.

According to the second embodiment, the portable information terminal 100 displays the gear value increase image 360 and the gear value decrease image 370 when the user does not perform a gear change operation, so that the user can easily observe the game image 301.

According to the second embodiment, the portable information terminal 100 generates the gear value increase image 360 slightly above the current touch position image 340, and generates the gear value decrease image 370 slightly below the current touch position image 340 regardless of the current position of the current touch position image 340, so that the user can easily determine that the operation that increases or decreases the movement parameter (e.g., gear change operation) has been detected.

Third Embodiment

In the second embodiment, the portable information terminal 100 displays the gear value increase image 360 or the gear value decrease image 370 only when the user has performed a gear change operation. Note that the portable information terminal 100 may always display the gear value increase image 360 and the gear value decrease image 370.

Figure 14:
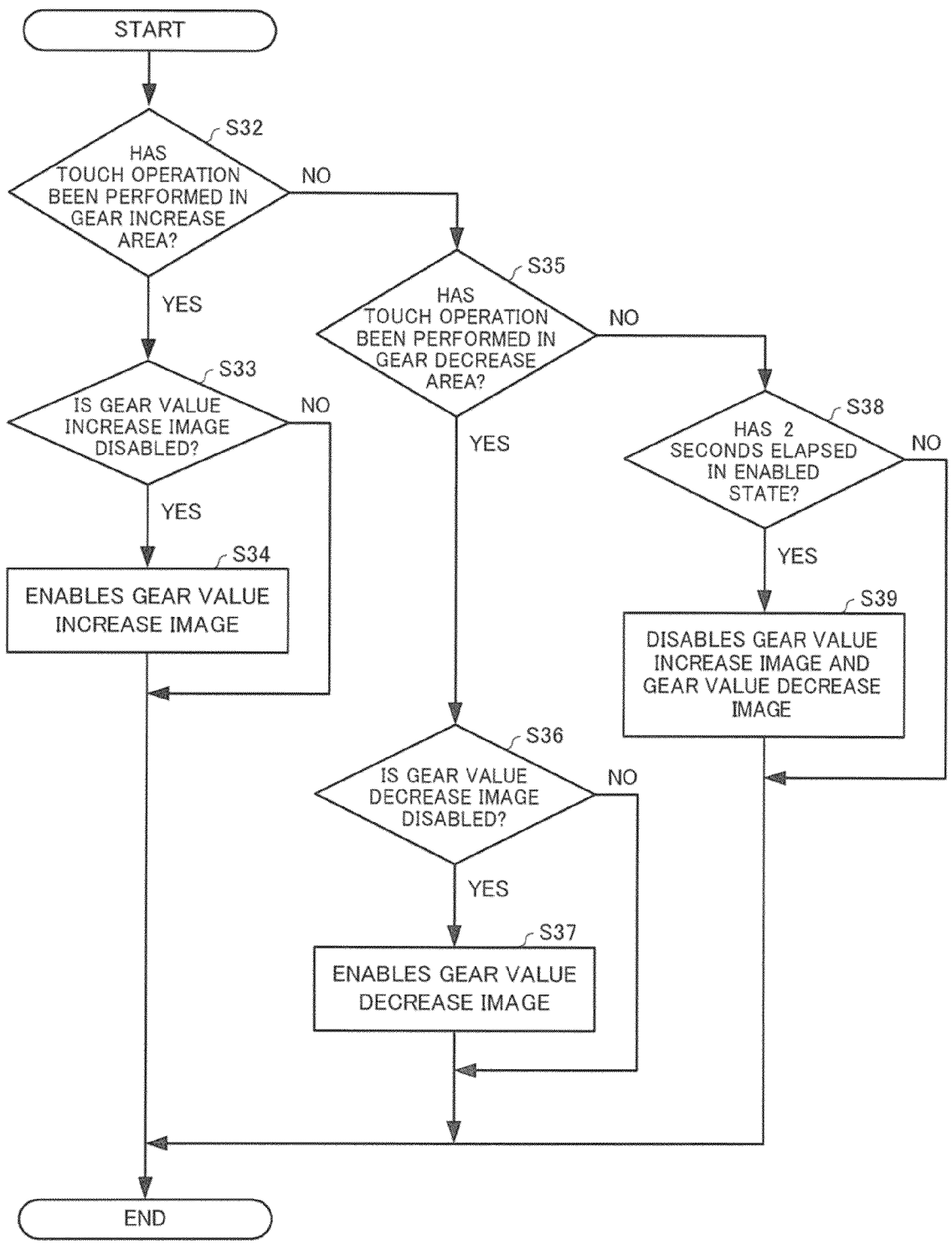
FIG. 14 is a flowchart illustrating a process relating to a gear value increase image and a gear value decrease image according to a third embodiment of the invention.
Figure 15:
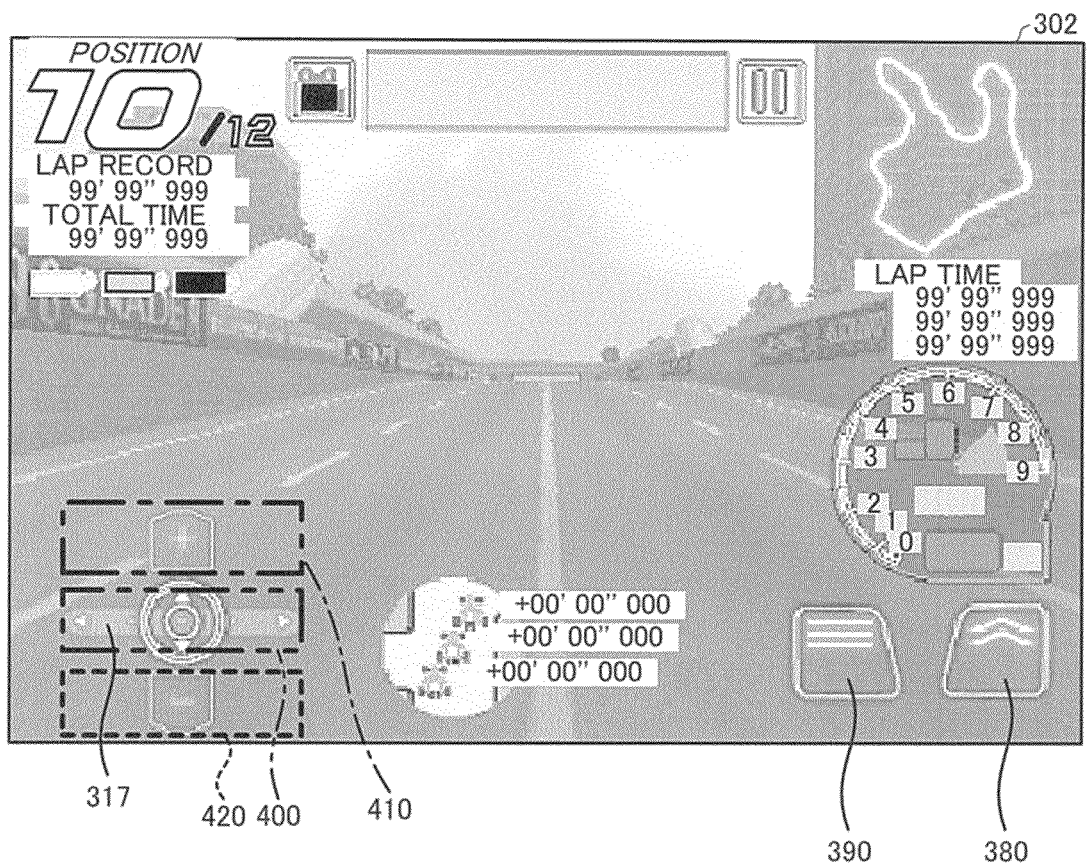
FIG. 15 is a diagram illustrating an example of a game image according to the third embodiment of the invention.

FIG. 14 is a flowchart illustrating a process according to a third embodiment in connection with the gear value increase image and the gear value decrease image. FIG. 15 is a diagram illustrating an example of a game image 302 according to the third embodiment.

The process illustrated in FIG. 14 is performed immediately after the step S4 or the step S6 illustrated in FIG. 3. The state determination section 141 determines whether or not a touch operation has been performed in the gear increase area 410 based on the detection result of the touch operation detection section 110 (step S32).

Figure 16:
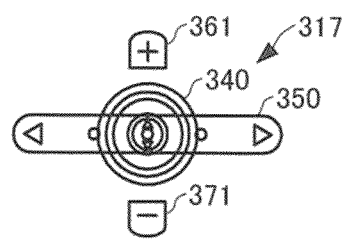
FIG. 16 is a diagram illustrating an example of an operation image according to the third embodiment of the invention.
Figure 17:
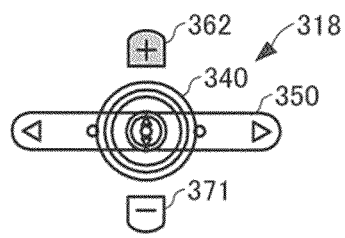
FIG. 17 is a diagram illustrating another example of an operation image according to the third embodiment of the invention.
Figure 18:
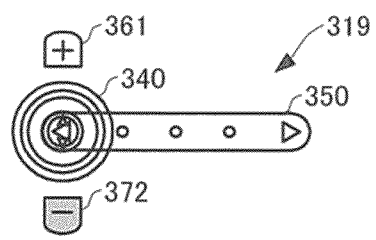
FIG. 18 is a diagram illustrating yet another example of an operation image according to the third embodiment of the invention.

FIG. 16 is a diagram illustrating an example of an operation image 317 according to the third embodiment. FIG. 17 is a diagram illustrating an example of an operation image 318 according to the third embodiment. FIG. 18 is a diagram illustrating an example of an operation image 319 according to the third embodiment.

The operation image 317 includes the current touch position image 340, the movable area image 350, a gear value increase image 361, and a gear value increase image 362. Since the gear value increase image 361 and the gear value increase image 361 are disabled, the gear value increase image 361 and the gear value increase image 362 are displayed in a semitransparent state.

When the state determination section 141 has determined that a touch operation has not been performed in the gear increase area 410, the state determination section 141 determines whether or not the gear increase area 410 is disabled (step S33). When the state determination section 141 has determined that the gear increase area 410 is disabled, the state determination section 141 enables the gear increase area 410 (step S34).

The operation image 318 including the gear value increase image 362 in a nontransparent state (having a transmittance lower than that of the semitransparent state) is thus displayed (see FIG. 17). The user can increase the gear value by one by moving a thumb in the upward direction (second direction) while pressing the current touch position image 340.

When the state determination section 141 has determined that a touch operation has not been performed in the gear increase area 410, the state determination section 141 determines whether or not a touch operation has been performed in the gear decrease area 420 based on the detection result of the touch operation detection section 110 (step S35).

When the state determination section 141 has determined that a touch operation has been performed in the gear decrease area 420, the state determination section 141 determines whether or not a gear value decrease image 371 is disabled (step S36). When the state determination section 141 has determined that the gear value decrease image 371 is disabled, the state determination section 141 enables the gear value decrease image 371 (step S37).

The operation image 319 including a gear value decrease image 372 in a nontransparent state is thus displayed (see FIG. 18). The user can decrease the gear value by one by moving a thumb in the downward direction (second direction) while pressing the current touch position image 340.

The image generation section 144 generates the operation images 317 to 319 based on the current touch position data 154 so that the gear value increase image 361 or 362 is displayed above the current touch position image 340, and the gear value decrease image 371 or 372 is displayed below the current touch position image 340 (step S6).

The state determination section 141 determines whether or not 2 seconds has elapsed in a state in which the gear value increase image 362 or the gear value decrease image 372 is enabled, and a new touch operation has not been performed (step S38). When the state determination section 141 has determined that 2 seconds has elapsed in the above state, the state determination section 141 disables the gear value increase image 362 or the gear value decrease image 372 that has been enabled (step S39).

The operation image 317 including the gear value increase image 361 in a semitransparent state and the gear value decrease image 371 in a semitransparent state is thus displayed (see FIG. 16).

According to the third embodiment, the portable information terminal 100 achieves the same effects as those achieved by the second embodiment.

Other Embodiments

The invention is not limited to the above embodiments. Various modifications and variations may be made. For example, the state determination section 141 may dynamically set the steering area (first area), the gear increase area (second area), and the gear decrease area (second area) based on the current touch position data 154.

Figure 19:
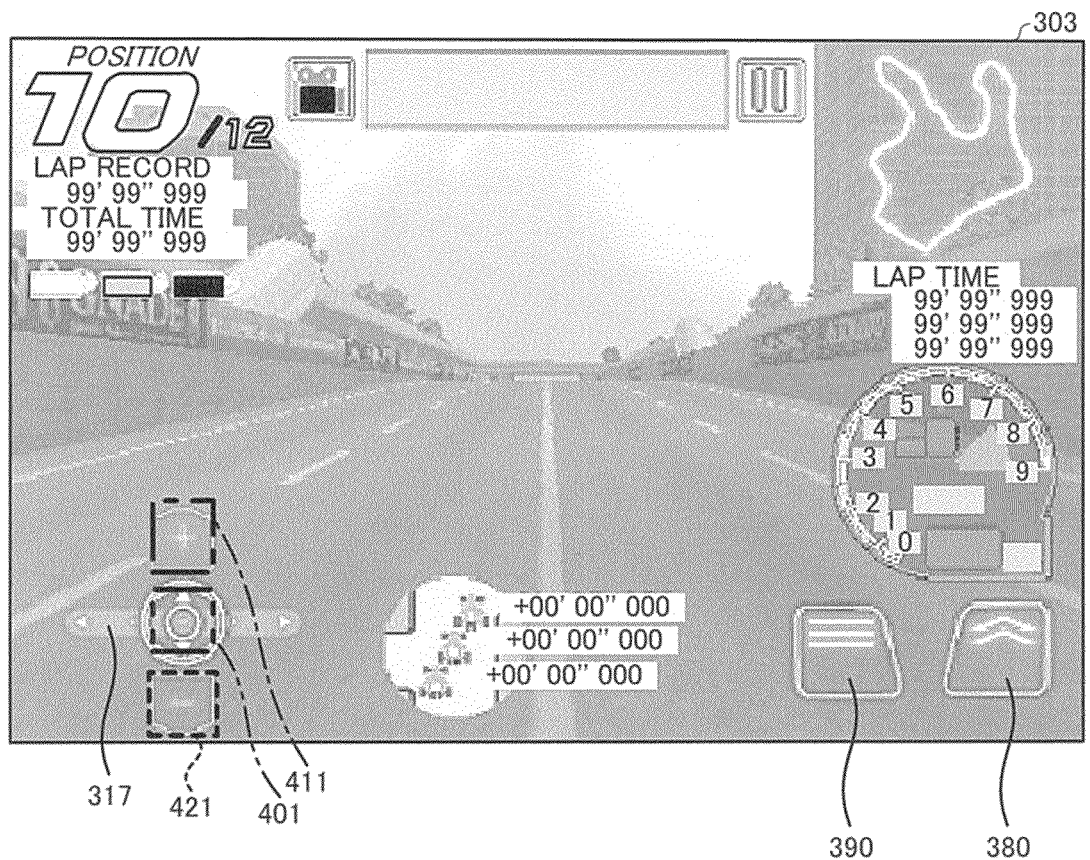
FIG. 19 is a diagram illustrating an example of a game image according to another embodiment.

FIG. 19 is a diagram illustrating an example of a game image 303 according to another embodiment. In the game image 303, a steering area 401 is set in the area of the current touch position image in the operation image 317, a gear increase area 411 is set above the current touch position image, and a gear decrease area 421 is set below the current touch position image.

The state determination section 141 moves the gear increase area 411 based on the movement of the current touch position image, and moves the gear decrease area 421 to a position below the current touch position image based on the current touch position data 154.

According to this embodiment, the portable information terminal 100 can more accurately deal with an operation.

The second area and the third area may be positioned within the first area, or may be continuous with the first area. The second direction may be a direction perpendicular to the first direction. It suffices that the second direction at least differ from the first direction.

The state determination section 141 may enable the gear value increase image 362, and disable the gear value decrease image 371 in the step S34 illustrated in FIG. 14, and may disable the gear value increase image 361, and enable the gear value decrease image 372 in the step S37. The determination time used in the step S38 is not limited to 2 seconds, but may be less than 2 seconds or more than 2 seconds.

The movement parameter for changing the moving speed is not limited to the gear value, but may be the engine speed value, the acceleration, the deceleration, the operation amount of an accelerator, the operation amount of a brake, the operation direction and the operation amount of a speed lever, or the like. The touch operation is not limited to a touch operation using a thumb, but may be a touch operation using a pen or the like. The touch operation detection section 110 may be a device that detects a touch operation using infrared radiation, ultrasonic waves, or the like.

It is not indispensable to store the current touch position data 154. For example, the image generation section 144 may generate the game image 300 based on the detection result of the touch operation detection section 110. The portable information terminal 100 need not necessarily include the tilt detection section 120, the communication section 130, the sound generation section 145, and the sound output section 170.

The state determination section 141 may perform the state determination process based on the detection result of the tilt detection section 120 instead of the detection result of the touch operation detection section 110 depending on the user setting and the like. The moving object is not limited to a racing car, but may be a racing motorcycle, a bicycle, a tank, a robot, an airplane, a train, or the like. The invention may also be applied to a simulation device or the like instead of a game device.

The device that functions as the game device is not limited to the portable information terminal 100, but may be an arbitrary electronic instrument (e.g., mobile phone, game device, and PC) that includes a touch panel.

The functions of the portable information terminal 100 may be implemented by a plurality of devices (e.g., a desktop PC and a liquid crystal display that includes a touch panel).

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium storing a program that can be executed by a computer that generates a game image in which a moving object moves in a game space based on a touch operation and a touch position on a screen, the program causing the computer to function as:

a state determination section that determines whether a current state of the screen is in a first state in which a first area in the screen is not touched or in a second state in which the first area is touched, based on the touch operation and the touch position;

an image generation section that generates a first image when the screen is in the first state and generates a second image when the screen is in the second state, the first image being an image in which an operation image in the first area is not changed, and the second image being an image in which the operation image in the first area is changed;

an update section that updates operation data based on the touch operation and the touch position in the first area when the screen is in the second state, the operation data indicating an operation direction and an operation amount of the moving object; and a calculation section that performs calculations for moving the moving object based on the operation data, the image generation section generating an image in which a current touch position image indicating a current touch position is moved corresponding to a change in the touch position, and generating an image in which the current touch position image) is returned to an initial position when the second state changes to the first state, as part of the operation image, based on the touch operation and the touch position; and the update section initializing the operation data when the second state changes to the first state.

2. The information storage medium as defined in claim 1,
wherein the moving object changes in moving speed based on a movement parameter;
wherein the state determination section determines whether or not a second area or a third area in the screen is touched based on the touch operation and the touch position when the screen is in the second state; and
wherein the image generation section generates a movement parameter increase image that receives an operation for increasing the movement parameter as part of the operation image when the second area is touched, and generates a movement parameter decrease image that receives an operation for decreasing the movement parameter as part of the operation image when the third area is touched.

3. The information storage medium as defined in claim 2,
wherein the state determination section sets the second area above the current touch position image in the screen, sets the third area below the current touch position image in the screen, and moves the second area and the third area corresponding to movement of the current touch position image.

4. The information storage medium as defined in claim 2,
wherein the image generation section generates the movement parameter increase image above the current touch position image, generates the movement parameter decrease image below the current touch position image, and moves the movement parameter increase image and the movement parameter decrease image corresponding to movement of the current touch position image.

5. The information storage medium as defined in claim 1,
wherein the moving object changes in moving speed based on a movement parameter;
wherein the operation image includes a movement parameter increase image that receives an operation for increasing the movement parameter, and a movement parameter decrease image that receives an operation for decreasing the movement parameter;
wherein the state determination section determines whether or not a second area or a third area in the screen is touched based on the touch operation and the touch position when the screen is in the second state; and
wherein the image generation section generates the operation image in which the movement parameter increase image is enabled and the movement parameter decrease image is disabled when the second area is touched, and generates the operation image in which the movement parameter increase image is disabled and the movement parameter decrease image is enabled when the third area is touched.

6. The information storage medium as defined in claim 1,
wherein the image generation section generates the first image or the second image in a state in which the operation image is displayed in a lower left area of the screen, and an acceleration image thr accelerating the moving object and a deceleration image for decelerating the moving object are displayed in a lower right area of the screen, when the screen is divided into four areas of upper left, upper right, lower left, and lower right.

7. A non-transitory computer-readable information storage medium storing a program that can be executed by a computer that generates a game image in which a moving object moves in a game space based on a touch operation and a touch position on a screen, the program causing the computer to function as:
an update section that updates operation data based on the touch operation and the touch position when the touch operation is performed in a first direction in a first area set in the screen, the operation data indicating an operation direction and an operation amount of the moving object; and
a calculation section that performs calculations for moving the moving object based on the operation data,
the update section updating a movement parameter for changing a moving speed of the moving object based on the touch operation and the touch position when the touch operation is performed in a second direction that is different from the first direction in a state in which the touch operation is performed in the first direction.

8. A game image generation device comprising:
a state determination section that determines whether a current state of a screen is in a first state in which a first area in the screen is not touched or in a second state in which the first area is touched, based on a touch operation and a touch position on the screen;
an image generation section that generates a first image when the screen is in the first state and generates a second image when the screen is in the second state, the first image being an image in which an operation image in the first area is not changed, and the second image being an image in which the operation image in the first area is changed;
an update section that updates operation data based on the touch operation and the touch position in the first area when the screen is in the second state, the operation data indicating an operation direction and an operation amount of the moving object; and
a calculation section that performs calculations for moving the moving object based on the operation data,
the image generation section generating an image in which a current touch position image indicating a current touch position is moved corresponding to a change in the touch position, and generating an image in which the current touch position image is returned to an initial position when the second state changes to the first state, as part of the operation image, based on the touch operation and the touch position; and
the update section initializing the operation data when the second state changes to the first state.

9. The game image generation device as defined in claim 8,
wherein the moving object changes in moving speed based on a movement parameter;
wherein the state determination section determines whether or not a second area or a third area in the screen is touched based on the touch operation and the touch position when the screen is in the second state; and
wherein the image generation section generates a movement parameter increase image that receives an operation for increasing the movement parameter as part of the operation image when the second area is touched, and generates a movement parameter decrease image that receives an operation for decreasing the movement parameter as part of the operation image when the third area is touched.

10. The game image generation device as defined in claim 9,
wherein the state determination section sets the second area above the current touch position image in the screen, sets the third area below the current touch position image in the screen, and moves the second area and the third area corresponding to movement of the current touch position image.

11. The game image generation device as defined in claim 9,
wherein the image generation section generates the movement parameter increase image above the current touch position image, generates the movement parameter decrease image below the current touch position image, and moves the movement parameter increase image and the movement parameter decrease image corresponding to movement of the current touch position image.

12. The game image generation device as defined in claim 8,
wherein the moving object changes in moving speed based on a movement parameter;
wherein the operation image includes a movement parameter increase image that receives an operation for increasing the movement parameter, and a movement parameter decrease image that receives an operation for decreasing the movement parameter;
wherein the state determination section determines whether or not a second area or a third area in the screen is touched based on the touch operation and the touch position when the screen is in the second state; and
wherein the image generation section generates the operation image in which the movement parameter increase image is enabled and the movement parameter decrease image is disabled when the second area is touched, and generates the operation image in which the movement parameter increase image is disabled and the movement parameter decrease image is enabled when the third area is touched.

13. The game image generation device as defined in claim 8,
wherein the image generation section generates the first image or the second image in a state in which the operation image is displayed in a lower left area of the screen, and an acceleration image for accelerating the moving object and a deceleration image for decelerating the moving object are displayed in a lower right area of the screen, when the screen is divided into four areas of upper left, upper right, lower left, and lower right.

* * * * *